May 20, 1924.

W. W. CONNERS

METHOD AND APPARATUS FOR INDICATING THE GEOGRAPHICAL
LOCATION OR MOVEMENT OF BODIES

Filed June 12, 1919

Inventor
Walter W Conners

Patented May 20, 1924.

1,494,770

UNITED STATES PATENT OFFICE.

WALTER W. CONNERS, OF ELIZABETH, NEW JERSEY.

METHOD AND APPARATUS FOR INDICATING THE GEOGRAPHICAL LOCATION OR MOVEMENT OF BODIES.

Application filed June 12, 1919. Serial No. 303,755.

*To all whom it may concern:*

Be it known that I, WALTER W. CONNERS, a citizen of the United States, residing at Elizabeth, in the county of Union and State of New Jersey, have invented certain new and useful Improvements in Methods and Apparatus for Indicating the Geographical Location or Movement of Bodies, of which the following is a specification.

My invention relates broadly to a method and apparatus for determining or indicating geographical location of a stationary or moving body.

The principal object of the present invention is to indicate in similitude or in intelligible signals the location of a moving body.

A further object of the present invention is to indicate visually or intelligently or both the location and movement in miniature or similitude of a moving body.

A further object is to move an indicator over a map of the zone being traversed in strict conformity with the movement of the moving body, with respect to the actual zone plotted on the map.

A further object is recording the movement of a body and time relation on a map or chart.

A further object is to provide for indicating visually or otherwise the speed of movement by a speed meter operated from the aforesaid indicator, and in this connection, another aim is to regulate the speed by means of said speed meter.

Another object is to guide a moving body in a predetermined course.

Still another object is to perform at a predetermined time or times a predetermined function or functions.

Another object is to perform or cause to be performed a predetermined function or functions at predetermined place or places.

A plurality of electromagnetic wave transmitting stations are provided, fixed with respect to the travel of the moving body or the body the location of which is to be determined; a directive receiving antenna is carried by said body, to successively receive waves from said stations; and determine their direction by measuring maximum intensity; at this instant amplified current acts causing a switch to rotate completing the circuit of one of a series of watt meters; these watt meters in turn affect the resistance of one branch of a Wheatstone bridge, and the balancing ammeter of the Wheatstone bridge circuit in turn causes the actuating means of the location indicator to be brought into play which balances both branches of the Wheatstone bridge.

Further objects are to synchronize the reception intervals of the receiving antenna and the movement of the distribution switch: to accurately regulate the quantity of electricity which flows thru the ampere hour meters, regardless of the rate of reception of the receiving antenna and the speed of rotation of the distribution switch; and to make novel provision for actuating the location indicator from the balancing Wheatstone bridge ammeters.

Still another object is to measure the included angles between planes extending from receiving antenna to a plurality of transmitting stations.

A further object is to determine the location of a point by determining the corresponding angle in two or more triangles which have one side in common and one known side, the theory of which changes when the number of known points is increased.

A further object is to determine the number of degrees between certain points by measuring and comparison of intervals of time.

With the foregoing and other objects in view, the invention resides in the method, combination and arrangement of parts hereinafter described and claimed, the accompanying drawings forming part of the specification.

Fig. 5 is a plan view of collector ring of receiving antenna.

Fig. 6 is a plan view of other corresponding collector ring of the receiving antenna.

Figure 1:
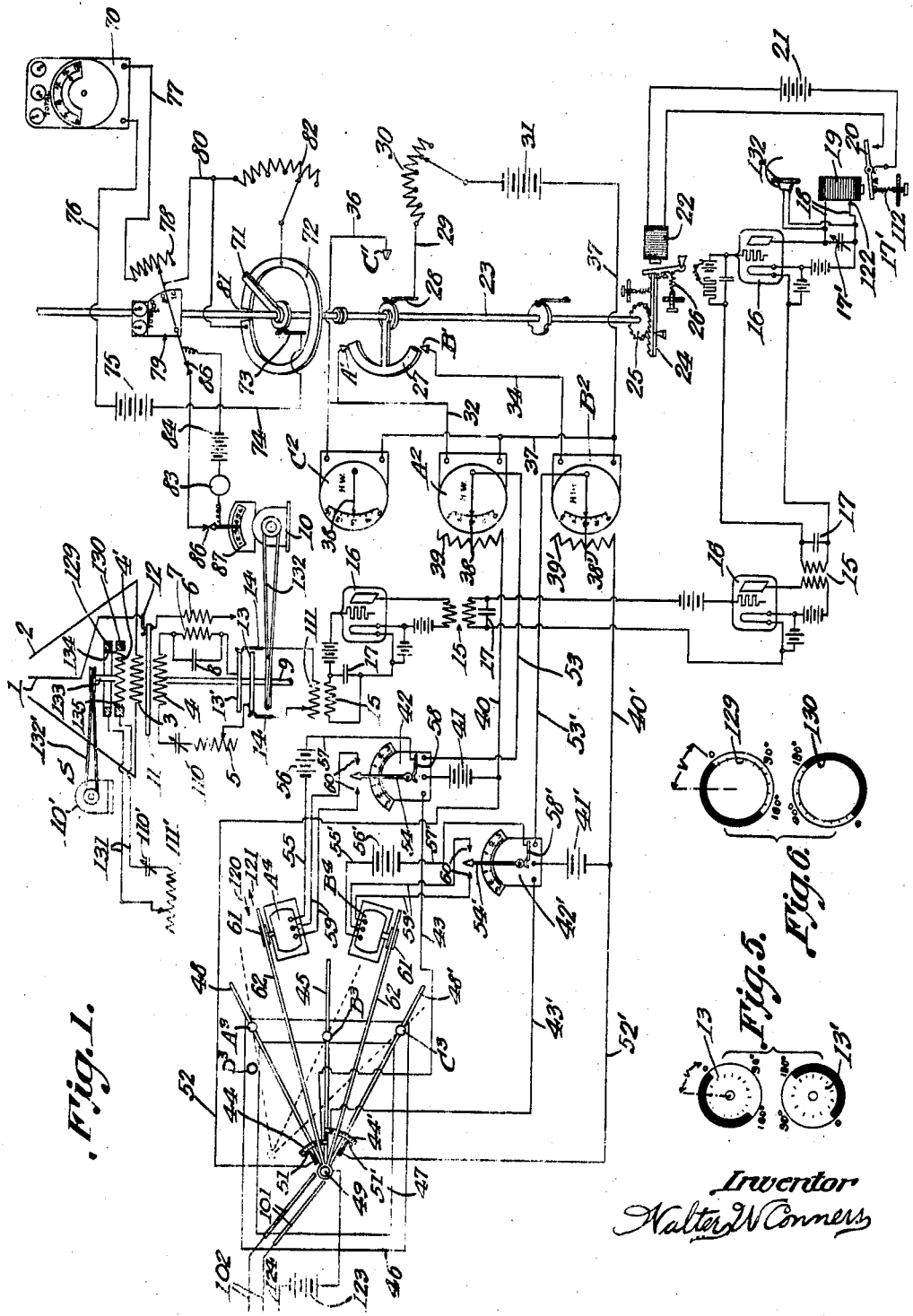
Figure 1 is a general diagram of the invention.

In the drawings, I have diagrammatically shown a receiving station S. It may be of a form similar to a type described in U. S. Patents to Messrs. Bellini and Tosi 945,448, 943,960 and 945,440 which may include a uniform receiving antenna 1, a directive receiving antenna 2 in series with primary 3, and a secondary 4 connected in series respectively with condenser 110, tuning coil 5 and the secondary 7, the latter being shunted by condenser 8. The parts 4 to 8 are rotated by a shaft or the like 9 which is driven by a motor 10 as shown and, in order to properly connect the antenna 1 with the rotating coil 6, a disk 11 carried by shaft 9 and brush 12 may be used. The tuner 5 is connected to collector ring 13 and secondary 7 to collector ring 13', the circuit being completed thru brushes 14 and primary 111 of amplifier which in general may consist of transformers 15, amplifier bulbs 16, condensers 17, etc., connected in cascade in a well known manner. See for instance U. S. patent to E. F. Alexanderson, 1,173,079 of Feb. 22, 1916; the function of which will later be described.

At suitable points, fixed with respect to the travel of the moving body on which the remainder of the apparatus may be carried are a plurality of transmitting stations, three being shown at A, B and C, and whenever the plane of the rotating coil 4 points to any of these stations, there is induced in it waves of maximum intensity, which are in turn amplified and a charge gradually builds up on condenser 17'. However, as the plane of coil 4 moves away from center of transmitting station the current in amplifier circuit lowers in value and the charge collected on condenser 17' passes thru circuit 18 magnetizing magnet 19 which momentarily closes the switch 20 normally held open by spring 112, thus momentarily closing circuit between battery 21 and more powerful magnet or the like 22, which magnet thru suitable means rotates a shaft 23 or its equivalent.

In the present disclosure, the magnet 22 operates a ratchet bar 24 which engages a ratchet wheel 25 on the shaft 23, said bar being returned after each shifting thereof, by a suitable spring 26.

Spaced preferably at equal angular distances around the shaft 23 are a number of contacts A' B' and C': which contacts correspond in number to the number of transmitting stations above described, three or more stations and contacts being preferable.

An arcuate distributor switch 27 is carried by shaft 23 and is of slightly less length than the distance between any of the contacts A', B' and C', whereby it must clear any one of these contacts before it engages the next, and an electrical connection is made with distributor bar 27 by a brush 28 which is in series with conductor 29, rheostat 30 later being connected to one terminal of source of current or battery 31.

A conductor 32 leads from contact A' to one terminal of ampere hour meter $A^2$; a conductor 34 connects contact B' to corresponding terminal of ampere hour meter $B^2$; also a conductor may connect corresponding terminal of an ampere hour meter $C^2$ to contact C', conductor 37 connects other terminal of said battery 31 to the other corresponding terminals of the ampere hour meters $B^2$, $A^2$ and $C^2$.

It will thus be seen that the current from the battery 31 will successively flow thru the three ampere hour meters $A^2$, $B^2$, $C^2$, as the distributor switch 27 engages the contacts A', B' and C', respectively. The index hands on all meters will be referred to as needles. The needles 38 of the ampere hour meters are of course moved in a certain relation to quantity of current flowing; as the ampere hour meters being preferably of the type in which the index hand indicates total amount of flow, fixed or variable load coils may be used. Thus it will be seen as above described that the quantity of electricity flowing thru ampere hour meters is directly proportional to length of time of such flow, it being understood resistances of all circuits being equal or its equivalent, and this time is regulated by the time required for the coil 4 Fig. 4 to turn from one station to the next. For instance, if it requires four seconds for the corresponding coil 4' to turn from direction of station A to station B, the ampere hour meter $A^2$ will be supplied with current for four seconds, and if we assume that current is supplied at the rate of flow of one ampere per second, the needle 38 of the meter $A^2$ will ultimately move to the four-watt position.

Obviously, the passage of current thru the watt meter for a greater or less length of time, will move the needle a correspondingly greater or less distance. This varied movement or function is utilized in a novel manner and is caused to vary in relation to the moving body, when it changes its angular relation to the stations A, B and C. Obviously this angle varies as the body changes its distance from the stations or its direction with respect thereto. I reproduce this angular or direction relation on the map or in similitude, and thus indicate the location of the body or perform other desirable functions.

The needles 38 of the ampere hour meters $A^2$ and $B^2$, travel along in electrical connection with resistance bars or other suitable means 39 and 39' respectively; and conductors 40 and 40' connect the resistances 39 and 39' with one terminal of the batteries or the like 41 and 41', whose other terminals are connected with ratio galvanometers 42 and 42', respectively. Conductors 43 and 43' lead from the ratio indicators 42 and 42' to corresponding resistances 44 and 44' which are carried by a rod 45 which is located over a table 46. This table may display a map 47 of the zone being traversed by the moving body.

Rod 45 slides thru a pivoted guide B³ carried by the table 46 or otherwise, and on opposite sides of this rod, may be other rods 48 and 48' slidable respectively thru additional pivoted guides A³ and C³. The three guides A³, B³, and C³ bear the same relation to each other as the three stations A, B and C or in other words geographical similitude, and all the rods 45, 48 and 48' converge from said guides to a common point and here may carry a location indicator 49 around which they are allowed pivoted movement. The rods 48 and 48' carry brushes 51 and 51' respectively which are in contact with resistances 44 and 44'; a conductor 52 leads to conductor 40 or otherwise connects the brush 51 with battery 41, and a corresponding conductor 52' similarly connects with battery 41'. Conductors 53 and 53' lead from the needles 38 and 38' to ratio meters 42 and 42' respectively.

Figure 2:
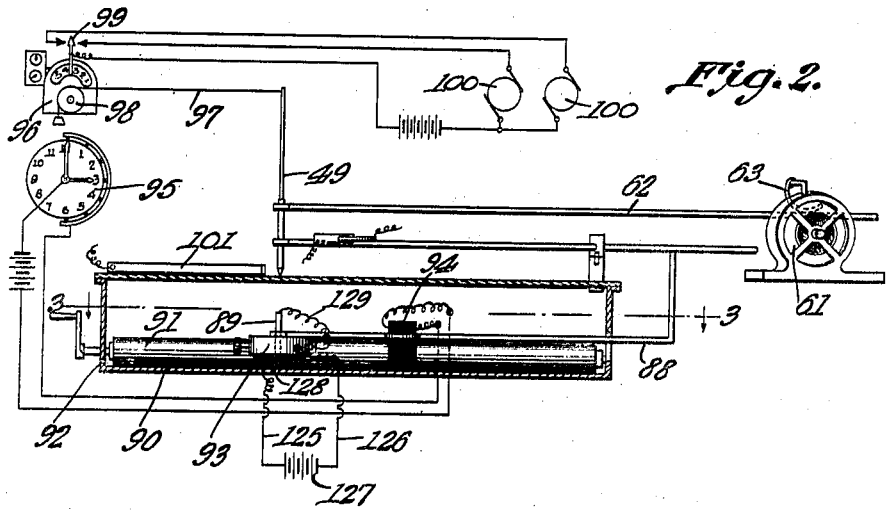
Fig. 2 is a vertical section showing more particularly the course and time recording means, and the speed meter.

By the arrangement just described, two balancing circuits are provided for each of the batteries 41 and 41' and may be described as Wheatstone type. For instance, current from the battery 41 may flow thru circuit conductor 40, resistance 39, needle 38, conductor 53 and ratio meter 42, while another circuit is completed thru said battery 41, ratio meter 42, conductor 43, resistance 44, brush 51, and conductor 52. The fixed resistance of these two said circuits being equal, the current from battery 41 will divide equally in each side, but if the ampere hour meter A² increases or decreases the resistance in its respective circuit, the needle 54 of ratio meter 42 will be deflected, due to the unbalanced resistance. A similar action will of course take place with the ratio meter needle 54' when the ampere hour meter B² either adds to or diminishes the resistance in its side of the circuit of battery 41'. I make use of the movement of the ratio meter needles 54 and 54' to shift the pointer 49, by employing the following features:

Two motors A⁴ and B⁴ are connected to conductors 55 and 55' in series with batteries 56 and 56' and conductors 57 and 57' which make contact with the needles 54 and 54', respectively. Conductors 59 and 59' lead from the motors A⁴ and B⁴ to contacts 60 disposed on opposite sides of the needles 54 and 54'. The motors A⁴ and B⁴ are reversible and current is supplied to said motors, for running them in one direction or the other, by completing certain circuits thru the instrumentality of the needle 54 and 54' and contacts 60. When needle 54 touches contact 60 on the left it causes motor A⁴ to move rod 62 in direction indicated by arrow 121 and the reverse movement takes place when right contact 60 is closed causing bar 62 to move in direction indicated by arrow 120. A similar operation takes place in motor control circuits of ratio meter 42'; this operation of the said motors, I use to move the indicator 49 in proportion to the movement of the ship or other body, and although this might be accomplished in numerous ways, I prefer the following:

Pulleys 61 are provided on the motor shafts and the operating bars 62 are held in frictional contact or otherwise with said pulleys by spring guides 63 as seen in Fig. 2, said bars being preferably pivotally connected to the indicator 49. By this arrangement, the motors will shift the indicator as is elsewhere herein described and the bars 62 being such that they may assume any angle to the said pulleys as the case may require and yet remain in operative relation.

Figure 4:
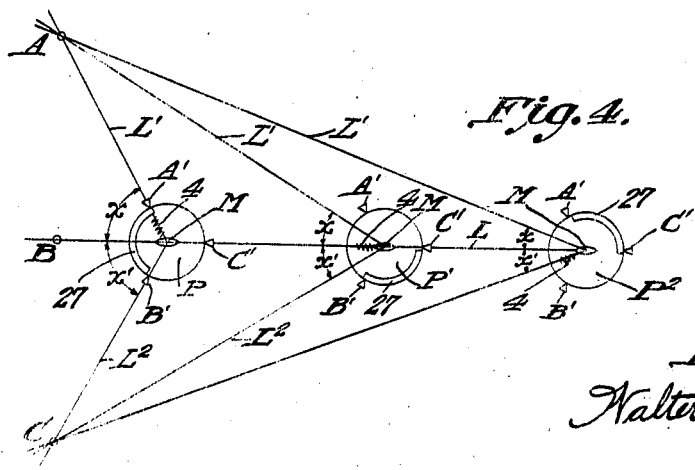
Fig. 4 is a diagram showing the operation of the device.

By the arrangement above described, the rods 45, 48 and 48' are maintained at the same angular relation as lines extending from the three stations A, B and C to the moving body or said body as indicated in Fig. 4 and thus the indicator 49 always occupies a point on the map 47 or the table 46 corresponding to the point actually occupied by the moving or said body. The course and location of the latter are thus given in, similitude or in miniature.

In the diagram of Fig. 4, the line L indicates a course of the moving body M, and for illustrative purposes, I have shown a straight course extending directly from station B. On this course, I have illustrated several positions (P, P', P²) of the body M and it will be seen that when this body is near the stations (see position P) comparatively wide angles $x$ and $x'$ exist between line L and the line L' and L², intersecting the stations A and C. As the body M moves away from stations however, these angles gradually decrease, as will be seen by comparing the several positions P, P', P². By at all time reproducing these angles and stations in similitude or miniature the exact location of the said body is given and this indication is accomplished by the combination of parts above described. This can best be explained by further reference to Fig. 4. The constantly rotating coil or other means, the distributor switch 27, and the contacts A', B' and C' are shown, and the three positions P, P' and P² show the relative positions of these parts at three different points in the rotation of the coil. Position P illustrates coil 4 moving out of plane P A and shows the distributor switch 27 in engagement with the contact A' with which it will remain in contact while coil 4 travels to a position of plane P B. Throughout this time, electricity was flowing thru ampere hour meter $A^2$ at a fixed rate of flow, thus the position or movement of the needle 38 along the resistance 39 is proportional to the interval or intervals of time it required coil 4 to traverse angle $x$, in other words work times time equals said position. The ratio meter 42 and $A^4$ are thus automatically operated to vary the angle between the rods 48 and 45 until such angle is exactly the same as angle $x$ over which the coil 4 has just swept. When this relative movement of the rods 48—45 takes place, the brush 51 varies the portion of the resistance bar 44 which is included in circuit to battery 41, and when the two said Wheatstone type circuits balance the ratio meter needle 54 returns to neutral, likewise motor $A^4$ stops. The resistance bars 39 and 44 being so proportioned that when the said circuits balance in operation the angle between rods 45 and 48 is exactly the same as angle $x$.

However, a triangle A, B, P with side A B and angle $x$ know is insoluble, unless one side or point can definitely be located which may be accomplished by a compass or the like. Preferably this may be accomplished by employing another triangle with one or more than one side or point in common or in a known or determinable relation. This may be as described the triangle C, B, P with side B C known and angle $x$ determinable.

Still considering position P of Fig. 4, it may be pointed out that the coil 4 may be at maximum intensity when pointing towards a transmitting station, likewise maximum potential exists in condenser 17', which in turn leaks off thru circuit 18 operating delicate magnet or other detector means. The controller 122 being means to vary the ampere turns on magnet 19 thereby controlling the movement of the operation of the switch 20 by the magnet 19 in relation to intensity of the current existing in the coil 4 or its like. For illustrative purpose it will be understood that all said transmitting stations which may be of any well known type are emitting continuous wave of such a character as to be receivable and identifiable when coil 4 is pointing in direction of one of said stations and maximum potential exists on condenser 17'. However, as coil 4 moves out of position of maximum intensity the potential of the charging source of condenser 17' is likewise reduced and the charge collected on condenser 17' operates the magnet, the operating point of which is controllable by controller 122.

It is not necessary that magnet 19 operate at maximum position, but at some general relative position.

The energizing of the magnet 19 closes the switch 20, the magnet 22 is thus brought into play to turn the shaft 23 in this particular case one third of a revolution, thereby shifting the distributor switch 27 from contact A' to B' as seen in position P' Fig. 4. Current is now flowing thru ampere hour meter $B^2$ and continues to flow therethru for the interval of time the coil 4 transverses the angle $x'$. This interval of time controls or ultimately controls the position of needle 38' on the resistance bar 39' of the wattmeter $B^2$, and as this in turn varies the resistance of one circuit of the battery 41' the ratio meter 42' and the needle 54' completes the circuit of motor $B^4$. This motor shifts the indicator 49 and varies the angle between the rods 45 and 48' to agree exactly with the angle $x'$, and when this reproduction has been effected, the brush 51' and the resistance 44' have equalized the resistance in the Wheatstone bridge type circuits of the battery 41', throwing the ratio meter 42' out of play and stopping the motor or operating means $B^4$, with the angle $x'$ reproduced thereby leaving the indicator 49 in a position on the map 47, corresponding to the actual geographical position of the body or said receiving antenna.

It is evident that by employing additional Wheatstone bridge type circuits, ratio meters 42 and 42', indicators 49 and operating means all complete as above described and similarly inserted in resistance bar circuits of ampere hour meters $A^2$ and $B^2$ or in conjunction with similar meters, all the functions could simultaneously be reproduced or duplicated in another part of said body or ship or other localities.

It will be observed that when the body has reached position P', the angles $x$ and $x'$ have greatly diminished and consequently when at this position, the switch 27 remains a shorter time in engagement with contacts A' and B'. Consequently the needles 38 and 38' will not include so much of the resistance bars 39 and 39', thereby affecting the action of the motors $A^4$ and $B^4$ accordingly, to at all operating time cause the rods 45, 48 and 48' to reproduce the angles $x$ and $x'$, thereby properly locating indicator 49 or the position of the body in similitude.

From the foregoing, it might be understood that only one motor and ratio meter act at one time and although this might occur at certain movements of the body, in most cases the movement of one motor is accompanied by a movement of the other motor. This is due to the fact that in most cases a change in angle $x$ is accompanied by a change in angle $x'$ or the movement of one motor may effect the resistance of other angle which would be corrected by the other motor. At or after maximum intensity in regards to station C has been reached, and coil 4 is sweeping towards station A, (see position P²) the condenser 17' may again discharge, closing switch 20 causing magnet 22 to again rotate shaft 23 to dispose switch 27 against contact C', thereby directing the flow of current from battery 31 thru ampere hour meter C², but this meter does not produce any direct effect on the indicator 49.

The above described cycle of operation may take place repeatedly, the indicator moving as long as body is moving and thus can show at all times the location of the body.

In order to operate the particular apparatus described successfully, it is essential that a predetermined quantity of electricity shall flow from battery 31 during one complete cycle or revolution of shaft 23 and coil 4. The ampere hour meter C² is instrumental in determining whether this proper discharge is taking place, since by adding the readings of meters A², B² and C² it may be readily determined if a greater or lesser quantity is flowing or has flowed and the rate thereof, and if in error it may be rectified automatically or by rheostat 30.

To determine whether the total reading of the meters A², B² and C² actually gives the correct amount of discharge and that the proper rate of discharge is taking place from battery 31, I employ wattmeter 70 and connections between it and the shaft 23. A contact arm 71 is carried by the shaft 23 and travels along a ring 72, and by means of a brush 73, a conductor 74 is electrically connected with the aforesaid arm, said conductor leading to a battery 75. A conductor 76 connects battery 75 to wattmeter 70; a conductor 77 leads from said wattmeter to a variable resistance 78 or the like controlled by a speed regulator or indicator 79 which is suitably constructed and operated by the shaft 23 and a conductor 80 connects needle of part 79 with the ring 72; by this arrangement the rate of discharge of battery 75 per revolution of shaft 23 may be determined by reading the discharge rate needle of the wattmeter 70, this may be controlled by rheostat 82 which is a shunt between ring 72 and conductor 80. Wattmeter 70 may also record the total discharge of battery 75 and as part 79 also indicates the total revolutions of shaft 23, it is evident that by dividing the total quantity of electricity that has flowed out of battery 75 by the number of revolutions the shaft 23 made during the same interval of time the answer would be the quantity that flowed per revolution of shaft 23, other things being constant. And by adjusting various parts so that battery 75 is discharging at the proper rate per revolution of shaft 23 it is evident this rate of discharge will be indicated by needle of meter 70 which should be equal to the sum of the readings of meters A², B² and C² and if they do not equal said meters may be made to read the same as meter 70 by regulating the flow of current by means of rheostat 30, it being understood that allowances should be made for differences in resistances of said circuits, meters, etc. The speed indicator needle of part 79 so regulates the circuit of battery 75 thru rheostat 78 that the reading of the meter 70 is at any time the total of what meters A², B² and C² should read. The necessity of this is evident when it is understood that a certain portion of the resistance bars 39 and 39' included in their respective circuits must correspond to the angles between the said body and transmitting stations regardless of the speed of rotation of coil 4 and its related parts. In other words the total quantity of electricity flowing thru ampere hour meters A² and B² should be in direct relation to angles $x$ and $x'$, which in turn likewise makes portions of resistances bars 39 and 39' in circuit directly proportional to angles $x$ and $x'$ respectively.

It is essential that one revolution of shaft 23 shall not pass more current thru meter 70 than thru meters A², B², and C² and consequently, I form a break in conductivity 81 in ring 72 of a width which will effect the flow of current in meter 70 to correspond to the break in battery circuit 31 caused by distributor switch 27 passing from one contact to another. The break or gap 81 also makes it possible to determine the amount of electricity flowing per single revolution as the circuit from battery 75 will be broken when arm 71 passes gap.

In order that the speed of the coil 4 and shaft 23 may be relatively synchronized at all times, I provide an indicator 83 in circuit with a battery 84 and two switches 85 and 86, the former being actuated by speedmeter 79, while the switch 86 is controlled by speed indicator 87. When the motor shafts 9 and 23 rotate in synchronism, the two switches remain closed, but when the speed of either changes, one switch or the other is opened and a suitable indicator 83 operates to show the discrepancy; it being evident that likewise attention should be given to the adjustment of rheostat 30. In order to adjust the distributor switch 27 so that it functions in correct relative position to the location of the transmitting stations and, to determine the correct relation of the coil 4 and switch 27 to the particular transmitting station, the uniform receiving antenna 1 and receiver 132 may be used in the well known manner. In order that the coil 4 functions only once for each transmitting station per cycle a portion of the collecting rings 13, 13', 129 and 30 is insulated as shown in Fig. 5 and 6 so that the circuits to coils 4 and 4' would be closed when a definite end of coil 4, Fig. 4 swept through an arc which included the transmitting stations and open when opposite end of coil passed through said arc.

In connection with the foregoing, I may employ a time and course recording means, a speed meter and controller, and an arrangement for keeping the moving body on a predetermined course.

Figure 3:
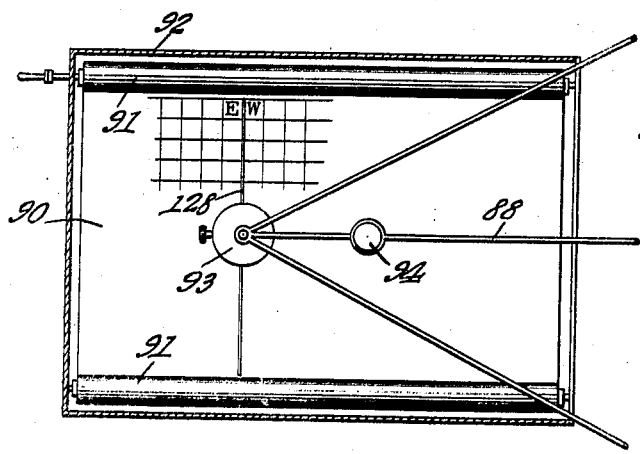
Fig. 3 is a horizontal section on line 3—3 of Fig. 2.

The time and course recording means (see Figs. 2 and 3) includes a yieldable arm 88 carried by one of the parts 48, 48', 45 or 62, said arm having a guide loosely receiving a pencil or pen 89 which travels over a chart, map or the like 90. This chart or the like may be wound on rollers 91 in a suitable case 92 having a metal bottom. The arm 88 carries a stamp 93, which may be constructed to print the time, date, etc., at which time points along the course are reached. It being understood that in this particular case the pen 89 is traversing a map in miniature or similitude of the zone being traversed by the said body. To bring the said stamp 93 down against the chart or the like 90, the arm 88 is preferably sprung downwardly, and this may be done by an electromagnet 94 whose circuit is completed at suitable intervals of time or distances by a clock or other means 95. The arm 88 moves the pencil or the like 89 in strict conformity with the indicator 49 and records the course, and at predetermined intervals the stamp 93 comes into play to record the time, date, etc., at which that particular part of the course is reached. This is often of great advantage.

Predetermined functions may be performed at a predetermined locality, such as indicating by signals location of ship, or it may often be of advantage to have the local time of the zone the body is in. For accomplishing this I have shown a conductor 128 which may be located in similitude where a change in time is to be effected, the pencil 89 may be a conductor and electrically connected by conductor 129 to part 93 which in turn is connected by conductor 126 to current source 127 which is in series with conductor 125 connected to conductor 128, the said circuit being closed when body reaches predetermined location by pencil 89 coming in contact with conductor 128, thus electrically resetting the time means 93 as may be desired, this may be performed by the well known method of electric clock setting.

The speed of the moving body is indicated by speed meter 96 which may be operated by any preferred means from indicator 49 or pencil 89. The same meter may also record distance traveled. I have shown a cord 97 and pulley 98 for these purposes and since the part 49 or 89 moves in similitude to the movement of the ship or body, the speed and distance of the ship or body may be accurately shown.

If desired the speed meter 96 may be made to operate a single pole double throw switch 99 to give a signal that speed of body is changing, or if desired, said switch may operate motors 100 as shown.

To assist in steering or to automatically guide the moving body over a predetermined course, I may provide parallel conductor guide rails 101 connected to conductor 102 which may lead to suitable instruments (not shown). Indicator 49 may be a conductor of electricity and electrically connected to one terminal of a source of electricity or battery 123, the other terminal of which is connected to conductor or 124 extending to said suitable instruments which may be same as part 100. When the body veers from its predetermined or desired course, the part in question is brought in contact with one rail or other, thereby actuating indicating instruments to show that the ship is off its course, or actuating automatic steering means for returning body to such course.

In several instances delicate switches have been shown as closing relatively powerful circuits such as described in the ratio and ampere hour meter needle circuits, it being understood this is merely for simplification and where an intermediate means is necessary it being understood that they are present.

The system is highly efficient and sensitive for giving the location of the moving body at all times, for recording the course, for recording the time certain points are reached, for keeping the moving body on its desired course, for showing its speed in relation to surface of earth, for recording exact distance traveled by body.

The above results may be obtained in numerous ways and the foregoing is merely for illustrative purposes; and it may be further explained that the indicating member 49 or 89 may perform numerous functions other than those disclosed, and that the method may be appliable to function in respect to a vertical plane as in a horizontal plane as is disclosed.

Referring to Fig. 1 secondary coil 4' is rotated by shaft 133 which is similarly operated by a motor 10' thru belt or other means 132'; the collector rings 129 and 130 shown in cross section for clearness are in series with coil 4' established by means of brushes 134 and 135. Conductors 131 are connected to rings 129 and 130, completing a circuit thru condenser 110' and primary 111'. Primary 111' may function similarly to primary 111 but in relation to a second complete set of apparatus which may be exactly similar to one above described, which makes it unnecessary to repeat or describe it further.

The function of having a double system operating preferably from the same receiving antenna is of vital importance, in certain instances. A turning movement which may be imparted to the receiving antenna by the moving body upon which it is located might have a tendency to increase or decrease the indicated angles between stations depending upon direction of said movement, type of receiving antenna used and speed of coil 4 in relation to movement of receiving antenna. However, by rotating coil 4' in opposite direction to coil 4 any said discrepancy will indicate itself in the readings of the various corresponding ampere hour meter of the two systems. It is also of vital importance to note that rotating the coils 4 and 4' at equal speed in opposite directions will cause, at the same phase of every revolution, the closing of switch 20 with accuracy at the same relative position of coil 4 to transmitting station. In other words at a slightly off position of maximum intensity, besides being a definite check for all other functions of said coils.

As the function of operation of the receiving apparatus is independent of whatever happens to be the direction or location of the said transmitting stations provided to the pivots, $A^3$, $B^3$, $C^3$, which correspond to the station in question, are located in miniature or geographical similitude on said box 46, it is evident that, if the moving body should happen to move out of range of one of the transmitting stations $A^3$, $B^3$, $C^3$, say $A^3$, and within receiving range of another transmitting station which may be designated as D, it also could be utilized to operate the apparatus described by moving the pivot post $A^3$, rod 48, to the corresponding location $D^3$. This would be very important in certain instances where the moving body traverses great distances, as it could carry a number of maps of the different zones to be traversed, and by properly relocating the pivots $A^3$, $B^3$, $C^3$ to their relative position on the map of the particular zone, being at that time traversed by said body or ship, the apparatus could be properly operated.

It is also understood that the transmitting stations $A^3$, $B^3$, $C^3$ can be transmitting waves of entirely distinct and noninterfering wave lengths, and the coil 4 or 4', tuned to receive all said waves, and the recording apparatus equipped with suitable receiving or amplifying circuits which would separate the different said wave lengths and utilize them to operate the switch 20 or the like in their respective order. These circuits could be of a similar type to any well known selective wave length type amplifying circuits.

The rings 129 and 130, disks 13 and 14, and the bars 44 and 44' could be indexed as shown or graduated in degrees. If the coil 4 was pointed towards, say the station $B^3$ in the well known manner and the coil 4' was likewise pointed in the direction of the station $A^3$, the difference in degrees of the planes of the said coils could be determined by reading the said index and by so moving rods 45 and 48 until the index on bar 44 corresponded to the above reading and in a similar manner producing the proper angle between rods 45 and 48', the location of the ship could be determined or indicated. This might be important in an emergency or for other purposes.

Claims:

1. In a device for reproducing the travel of a moving body, wave transmitting stations fixed with respect to the movement of said body, a wave receiving station carried by said body, an indicating member movably carried by said body, and means controlled by the waves received, for moving said indicating member in similitude to the movement of said body.

2. In a device for reproducing the travel of a moving body, wave transmitting stations fixed with respect to each other and with respect to the travel of said body, a receiving station carried by said body for successively receiving waves from said stations, an indicating member carried by said body, and means controlled by the waves received, for moving said indicating member in similitude to the movement of said body.

3. In a device for automatically reproducing the location of a body, wave transmitting stations fixed with respect to the movement of said body, a wave receiving station carried by said body, an indicating member movably carried by said body, and means controlled by the waves received, for moving said indicating member in similitude to indicate location of said body.

4. In a device for reproducing the travel of a moving body, a plurality of wave transmitting stations fixed with respect to each other and with respect to the travel of said body, whereby the angles between said body and said stations are constantly varied, a receiving station carried by said body, and means controlled by the waves received, for at all times reproducing the aforesaid angles in similitude.

5. In a device for reproducing the travel of a moving body, a plurality of wave transmitting stations fixed with respect to each other and with respect to the travel of said body, whereby the angles between said stations and body are constantly varied, angle reproducing means, and a receiving station carried by said body for controlling said angle producing means in accordance with the duration of time required for said receiving station to traverse the aforesaid angles.

6. In a device for reproducing the travel of a moving body, a plurality of wave transmitting stations fixed with respect to each other and with respect to the travel of the body, whereby the angles between said stations and body are constantly varied, angle reproducing means, electric operating means for said angle reproducing means, including a switch, and a receiving station carried by the body for controlling said switch.

7. In a device for reproducing the travel of a moving body, a plurality of wave transmitting stations fixed with respect to each other and with respect to the travel of the body, whereby the angles between said stations and body are constantly varied, angle reproducing means, electric operating means for said angle reproducing means, including a switch movable to different operative positions, a receiving station carried by said body, and means controlled by the waves received, for moving said switch to its different operative positions.

8. In a device for reproducing the travel of a moving body, a plurality of wave transmitting stations fixed with respect to each other and with respect to the travel of the body, whereby the angles between said stations and body are constantly varied, angle reproducing means, electric operating means for said angle reproducing means, including separate instruments and a switch movable to different positions for completing the circuits of said instruments, a receiving station carried by said body, and means controlled by the waves received, for moving said switch to its different operative positions.

9. In a device for reproducing the travel of a moving body, a plurality of wave transmitting stations fixed with respect to each other and with respect to the travel of the body, whereby the angles between said stations and body are constantly varied, angle reproducing means, electric operating means for said angle reproducing means, whose circuits are provided with switches, balanced circuits for operating said switches when thrown out of balance, and variable resistance instruments for controlling the balance of said circuits, means for throwing said variable resistance instruments into play, including a switch movable to different operative positions, a receiving station on said body, and means controlled by the waves received, for moving said switch to its different operative positions.

10. In a device for reproducing the travel of a moving body, a plurality of stations fixed with respect to each other and with respect to the travel of said body, a plurality of guides carried by said body in the same relation as said stations, rods slidably engaged with said guides and converging to a common point, representing the body in similitude, and means for automatically varying the angles between said rods in accordance with the manner in which said body varies its angular relation with said stations.

11. In a device for reproducing the travel of a moving body, a plurality of wave transmitting stations fixed with respect to each other and with respect to the travel of said body, a plurality of guides carried by said body in the same relation as said stations, rods slidably engaged with said guides and converging to a common point, representing the body in similitude, a receiving station on said body to receive waves from said stations, and means controlled by the waves received, for varying the angles between said rods in accordance with the manner in which said body varies its angular relation with said stations.

12. In a device for reproducing the travel of a moving body, a plurality of stations fixed with respect to each other and with respect to the travel of said body, a plurality of guides carried by said body in the same relation as said stations, rods slidably engaged with said guides and converging to a common point, representing the body in similitude, means for automatically varying the angles between said rods in accordance with the manner in which said body varies its angular relation with said stations, a chart, means actuated by said rods for recording the course of the body on said chart, and means for recording the time certain points along said course are reached.

13. In a device for reproducing the travel of a moving body, a plurality of stations fixed with respect to each other and with respect to the travel of said body, whereby the angles between said body and said stations are constantly varied, and means for at all times reproducing these angles in similitude; together with a chart, means actuated by said angle reproducing means for recording the course of the body of said chart, and means for recording the local time certain points along said course are reached.

14. In combination with a moving body, a plurality of wave transmitting stations fixed with respect to the travel of said body, a receiving station on said body, and means controlled by the waves received, for showing the course of the body in similitude.

15. In combination with a moving body, a plurality of wave transmitting stations fixed with respect to the travel of said body, a receiving station on said body, and means controlled by the waves received, for recording the course of the body.

16. In combination with a moving body, a plurality of wave transmitting stations fixed with respect to the travel of said body, a receiving station on said body, and means controlled by the waves received, for recording the course of the body and recording the time certain points along said course are reached.

17. In combination with a moving body, a plurality of wave transmitting stations fixed with respect to the travel of said body, a receiving station on said body, a course indicator, means controlled by the waves received, for actuating said indicator, and means actuated by said indicator for controlling the steering of the body.

18. In combination with a moving body, a plurality of transmitting stations fixed with respect to the travel of said body, a receiving station on said body, a course indicator, means controlled by the waves received, for actuating said indicator, and means actuated by said indicator for showing the speed of the body.

19. In combination with a moving body, a plurality of transmitting stations fixed with respect to the travel of said body, a receiving station on said body, a course indicator, means controlled by the waves received, for actuating said indicator, means actuated by said indicator for showing the speed of the body, and means actuated by said speed showing means for controlling the speed of said body.

20. A moving body having receiving stations constantly rotating in opposite directions, relatively fixed transmitting stations acting on said receiving stations, and a mechanism controlled from the receiving stations, the rotation of the receiving stations in opposite directions compensating in the control of said mechanism for irregularities in the movement of the body.

21. In combination with a movable body, a plurality of known located wave transmitting stations, a receiving station on said body, and means controlled by the waves received, for automatically indicating the location of said body.

22. In combination with a movable body, a plurality of known located wave transmitting stations, a receiving station on said body, and means controlled by the waves received, for automatically determining and visually indicating the location of said body.

23. In combination, a body having geographical movement, an indicator on the body participating in the geographical movement and having individual movement on the body in accordance with the geographical movement of the body, operative means for moving the indicator on the body, and means exterior the body controlling the operative means.

24. In combination with a moving body, a plurality of wave transmitting stations fixed with respect to the travel of said body, a receiving station on said body, a course indicator, means controlled by the waves received, for actuating said indicator, and means actuated by said indicator for recording the distance the body travels.

25. In combination with a moving body, a plurality of wave transmitting stations fixed with respect to the travel of said body, a receiving station on said body, a course indicator, means controlled by the waves received, for actuating said indicator, and means actuated by said indicator for operating a controlling device at a predetermined location.

26. In combination with a moving body, a plurality of wave transmitting stations fixed with respect to the travel of said body, a receiving station on said body, a course indicator, means controlled by the waves received, for actuating said indicator, and means actuated by said indicator for controlling the movements of said body to a predetermined place.

27. In combination with a moving body, a plurality of wave transmitting stations fixed with respect to the travel of said body, a receiving station on said body, a course indicator, means controlled by the waves received, for actuating said indicator, and means for guiding said body to a predetermined place at a predetermined time.

In testimony whereof I affix my signature.

WALTER W. CONNERS.